(12) United States Patent
Itagaki et al.

(10) Patent No.: US 10,974,745 B2
(45) Date of Patent: Apr. 13, 2021

(54) ON-BOARD SYSTEM AND TRAIN OCCUPANCY RANGE CALCULATION METHOD

(71) Applicant: KYOSAN ELECTRIC MFG. CO., LTD., Yokohama (JP)

(72) Inventors: Tomonori Itagaki, Kawasaki (JP); Toshifumi Nishi, Yokohama (JP); Kenji Mizuno, Sagamihara (JP); Tamotsu Yokoyama, Yokohama (JP)

(73) Assignee: KYOSAN ELECTRIC MFG. CO., LTD., Yokohama (JP)

(*) Notice: Subject to any disclaimer, the term of this patent is extended or adjusted under 35 U.S.C. 154(b) by 257 days.

(21) Appl. No.: 16/185,096

(22) Filed: Nov. 9, 2018

(65) Prior Publication Data

US 2019/0077427 A1    Mar. 14, 2019

Related U.S. Application Data

(63) Continuation of application No. PCT/JP2016/064104, filed on May 12, 2016.

(51) Int. Cl.
- *B61L 3/00* (2006.01)
- *B60L 15/40* (2006.01)
- *B61L 25/02* (2006.01)
- *B61L 3/12* (2006.01)

(52) U.S. Cl.
CPC .............. *B61L 3/008* (2013.01); *B60L 15/40* (2013.01); *B61L 3/006* (2013.01); *B61L 3/125* (2013.01); *B61L 25/025* (2013.01); *B60L 2200/26* (2013.01); *Y02T 90/16* (2013.01)

(58) Field of Classification Search
CPC .......... B61L 3/006; B61L 3/008; B61L 3/125; B60L 15/40
USPC .......................................................... 701/19
See application file for complete search history.

(56) References Cited

U.S. PATENT DOCUMENTS

| | | | |
|---|---|---|---|
| 2005/0133673 A1* | 6/2005 | Sugita | B61L 27/0038 246/167 R |
| 2009/0105893 A1* | 4/2009 | Kernwein | B61L 25/025 701/19 |
| 2009/0230254 A1* | 9/2009 | Daum | B61L 3/125 246/27 |

(Continued)

FOREIGN PATENT DOCUMENTS

| | | |
|---|---|---|
| EP | 2614983 A2 | 7/2013 |
| JP | 04-108479 U1 | 9/1992 |

(Continued)

*Primary Examiner* — Peter D Nolan
*Assistant Examiner* — Luke Huynh
(74) *Attorney, Agent, or Firm* — Muncy, Geissler, Olds & Lowe, P.C.

(57) ABSTRACT

An on-board system increases a forward margin distance and a backward margin distance to expand an train occupancy range, when it is determined that position correction communications with a balise fail to be performed when a train passes through an installation position of the balise, that is, when it is determined that a detection failure has occurred. The expanded train occupancy range is restored to the train occupancy range before being expanded, when it is determined that the position correction communications have been successfully performed with a next balise, that is, when detection has been successfully performed.

5 Claims, 9 Drawing Sheets

(56) References Cited

U.S. PATENT DOCUMENTS

2014/0012439 A1* 1/2014 Dimmer ............... B61L 25/025
                                                        701/19
2014/0117169 A1* 5/2014 Itagaki ................. B61L 1/10
                                                        246/34 R
2019/0077431 A1   3/2019 Mizuno et al.

FOREIGN PATENT DOCUMENTS

| JP | 2013-141891 A | 7/2013 |
| JP | 5680762 B2 | 3/2015 |
| JP | 2015-189361 A | 11/2015 |
| WO | 2014064826 A1 | 5/2014 |

* cited by examiner

FIG. 7

[BALISE DETECTION DATA]      314

| BALISE ID | TRAIN POSITION AT DETECTION TIMING | DETECTION FLAG |
|---|---|---|
| 001 | 98 | 1 |
| 002 | — | 0 |
| 003 | 1201 | 1 |
| ⋮ | ⋮ | ⋮ |

FIG. 8

[BALISE DB]      310

| BALISE ID | INSTALLATION POSITION |
|---|---|
| 001 | 100 |
| 002 | 600 |
| 003 | 1200 |
| ⋮ | ⋮ |

FIG. 9

[MARGIN DISTANCE TABLE]      306

| CONSECUTIVE FAILURE DETECTION COUNT | FORWARD MARGIN DISTANCE $L_{dh}$ | BACKWARD MARGIN DISTANCE $L_{dr}$ |
|---|---|---|
| 0 | 15 | 15 |
| 1 | 20 | 20 |
| 2 | 30 | 30 |
| ⋮ | ⋮ | ⋮ |

US 10,974,745 B2

ON-BOARD SYSTEM AND TRAIN OCCUPANCY RANGE CALCULATION METHOD

CROSS REFERENCE TO RELATED APPLICATION

This application is a continuation of International Patent Application No. PCT/JP2016/064104, having an international filing date of May 12, 2016, which designated the United States, the entirety of which is incorporated herein by reference.

BACKGROUND

Development of wireless train control systems using wireless communications for ground-on-board communications has progressed. In the wireless train control systems, a ground side is notified of a train position calculated by an on-board system, so that a cost for ground-side equipment can be reduced. The on-board system calculates the train position on the basis of a rotation detection signal, corresponding to rotation of wheels, output by a rotation detector including a tacho-generator (TG) and a pulse generator (PG) provided to an axle. Such calculation of the train position based on the rotation detection signal is plagued by an error due to wearing or slip-or-skid of the wheels, and the like. In view of this, it is common practice to provide balises for position correction along a track, and correct the train position, calculated by the on-board system, with an installation position associated with a balise when the train passes through the balise (see, for example, Japanese Unexamined Utility Model Application Publication No. 4-108479).

Unfortunately, the train position may fail to be corrected even when the train passes through a balise due to various factors including: a failure of the on-board system; a failure of the balise; and a simple communication failure. The train position error might lead to incidents such as a train crash, and thus is extremely dangerous.

Considering this, the train may be stopped each time the train position fails to be corrected due to a communication failure, but such a rule is too strict that it might negatively impact the train service.

SUMMARY

According to the first aspect of the invention, there is provided an on-board system mounted on a train that travels on a track, and calculating a train occupancy range in which the train may exist, wherein
the train is provided with a rotation detector and a communication device, the rotation detector outputting a rotation detection signal corresponding to rotation of an axle or a wheel, the communication device performing, when the train passes through an installation position of each of balises for position correction provided along the track, predetermined position correction communications with the balise, the on-board system performing:
calculating a train position of the train on the basis of the rotation detection signal,
detecting that the position correction communications have been performed,
correcting the train position on the basis of the position correction communications when the detecting has been successfully performed,
setting a first detection range for determining whether or not a balise to be detected next is detected and a second detection range with a range limit situated anterior to the first detection range,
determining that detection failure has occurred when the train position exceeds the first detection range with the detecting failing for the balise to be detected next,
counting a consecutive detection failure count indicating number of times the detection failure has been determined to have consecutively occurred,
determining the train occupancy range of a predetermined range length with respect to the train position, the train occupancy range being determined with the range length of the train occupancy range increased when the train position exceeds the second detection range with the detecting failing for the balise to be detected next, and
stopping the train when the consecutive detection failure count reaches a predetermined count.

According to the second aspect of the invention, there is provided a train occupancy range calculation method performed by an on-board system mounted on a train that travels on a track to calculate a train occupancy range in which the train may exist,
the train being provided with a rotation detector and a communication device, the rotation detector outputting a rotation detection signal corresponding to rotation of an axle or a wheel, the communication device performing, when the train passes through an installation position of each of balises for position correction provided along the track, predetermined position correction communications with the balise, the method comprising:
calculating a train position of the train on the basis of the rotation detection signal,
detecting that the position correction communications have been performed,
correcting the train position on the basis of the position correction communications when the detecting has been successfully performed,
setting a first detection range for determining whether or not a balise to be detected next is detected and a second detection range with a range limit situated anterior to the first detection range,
determining that detection failure has occurred when the train position exceeds the first detection range with the detecting failing for the balise to be detected next,
counting a consecutive detection failure count indicating number of times the detection failure has been determined to have consecutively occurred,
determining the train occupancy range of a predetermined range length with respect to the train position, the train occupancy range being determined with the range length of the train occupancy range increased when the train position exceeds the second detection range with the detecting failing for the balise to be detected next, and
stopping the train when the consecutive detection failure count reaches a predetermined count.

BRIEF DESCRIPTION OF THE DRAWINGS

FIG. 7 is a diagram illustrating an example of a data structure of balise detection data.

FIG. 8 is a diagram illustrating an example of a data structure of a balise DB.

FIG. 9 is a diagram illustrating an example of a data structure of a margin distance table.

DESCRIPTION OF EXEMPLARY EMBODIMENTS

Figure 1:
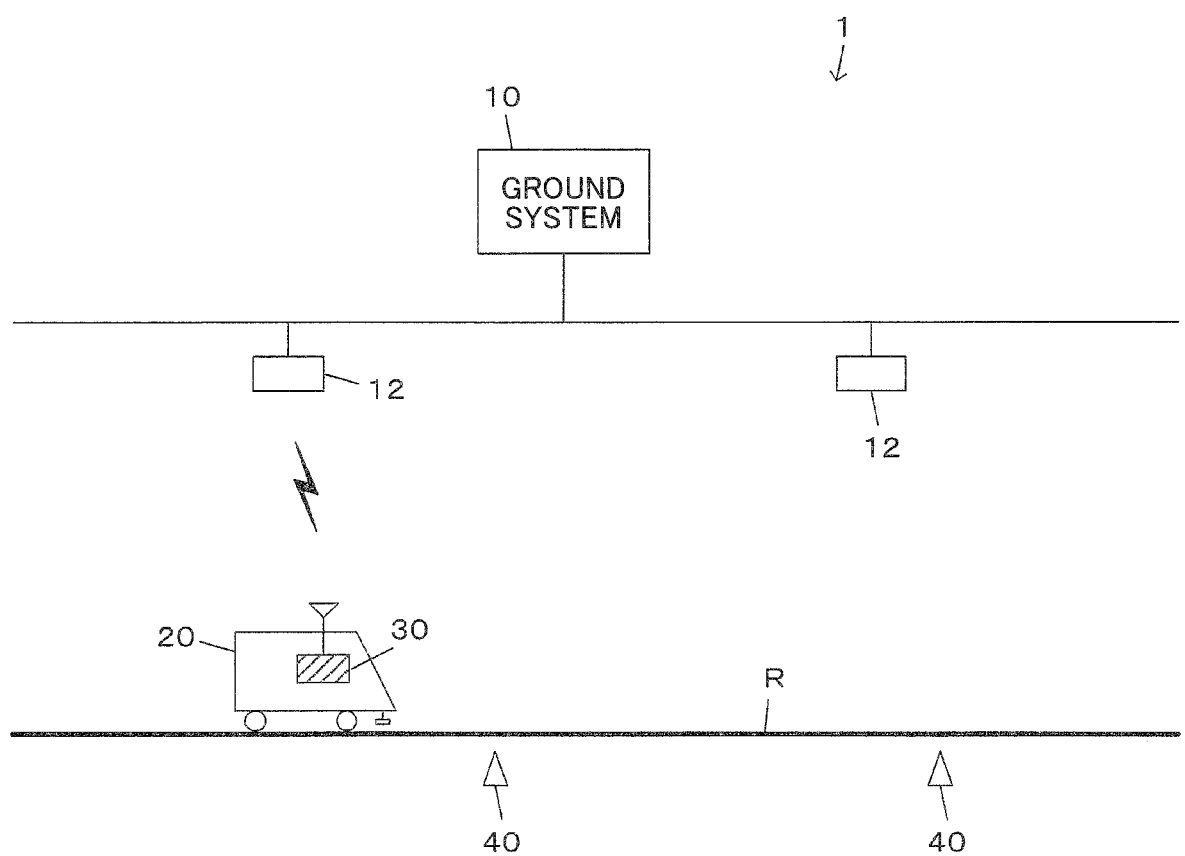
FIG. 1 is a diagram illustrating the entire configuration of a train control system.

The present invention is to provide a technique of providing safe train service even when a train position fails to be corrected with position correction communications with a balise.

According to one embodiment of the invention, there is provided an on-board system mounted on a train that travels on a track, and calculating a train occupancy range in which the train may exist, wherein the train is provided with a rotation detector and a communication device, the rotation detector outputting a rotation detection signal corresponding to rotation of an axle or a wheel, the communication device performing, when the train passes through an installation position of each of balises for position correction provided along the track, predetermined position correction communications with the balise, the on-board system performing:

calculating a train position of the train on the basis of the rotation detection signal, detecting that the position correction communications have been performed, correcting the train position on the basis of the position correction communications when the detecting has been successfully performed, setting a first detection range for determining whether or not a balise to be detected next is detected and a second detection range with a range limit situated anterior to the first detection range, determining that detection failure has occurred when the train position exceeds the first detection range with the detecting failing for the balise to be detected next, counting a consecutive detection failure count indicating number of times the detection failure has been determined to have consecutively occurred, determining the train occupancy range of a predetermined range length with respect to the train position, the train occupancy range being determined with the range length of the train occupancy range increased when the train position exceeds the second detection range with the detecting failing for the balise to be detected next, and stopping the train when the consecutive detection failure count reaches a predetermined count.

According to another embodiment of the invention, there is provided a train occupancy range calculation method performed by an on-board system mounted on a train that travels on a track to calculate a train occupancy range in which the train may exist, the train being provided with a rotation detector and a communication device, the rotation detector outputting a rotation detection signal corresponding to rotation of an axle or a wheel, the communication device performing, when the train passes through an installation position of each of balises for position correction provided along the track, predetermined position correction communications with the balise, the method comprising:

calculating a train position of the train on the basis of the rotation detection signal, detecting that the position correction communications have been performed, correcting the train position on the basis of the position correction communications when the detecting has been successfully performed, setting a first detection range for determining whether or not a balise to be detected next is detected and a second detection range with a range limit situated anterior to the first detection range, determining that detection failure has occurred when the train position exceeds the first detection range with the detecting failing for the balise to be detected next, counting a consecutive detection failure count indicating number of times the detection failure has been determined to have consecutively occurred, determining the train occupancy range of a predetermined range length with respect to the train position, the train occupancy range being determined with the range length of the train occupancy range increased when the train position exceeds the second detection range with the detecting failing for the balise to be detected next, and stopping the train when the consecutive detection failure count reaches a predetermined count.

The present invention can guarantee train service with high safety, even when a detection failure occurs with no position correction communications performed with a balise an installation position of which has been passed through, that is, with no train position correction based on the balise performed. Specifically, when the traveling continues with the detection failure occurred not corrected, an error may increase as the train travels. The train control is performed with the train occupancy range used for the position of each train. The train occupancy range is a range in which the train may exist on the track. According to the present invention, the train occupancy range is expanded by taking account of an error in the train position when the detection failure occurs. Thus, safety can be guaranteed for the train service.

The on-board system may comprise, wherein the determining the train occupancy range may include increasing the range length stepwise, in accordance with the consecutive detection failure count.

With this aspect of the present invention, even higher safety can be guaranteed for the train service with the range length of the train occupancy range increased stepwise in accordance with the number of times the detection failure has consecutively occurred. This is because the error in the train position may increase as the traveling distance increases, when the train position is not corrected after the position correction communications with the balise fail.

The on-board system may further comprise issuing a predetermined notification when the correcting is performed for an error of the train position that is equal to or larger than a predetermined threshold.

With this aspect of the present invention, the notification indicating that there has been an error in the train position is issued to the ground side for example. This is because an error is likely to have occurred in the calculation of the train position in the on-board system when the error in the train position is equal to or larger than the predetermined threshold. With the notification thus issued, the ground side can take an appropriate measure under an assumption that the train position notified from the train is incorrect. For example, the notification may be issued to the cab so that a driver can be aware of the fact that the error in the train position of the train he or she is driving is increasing, and thus can be more careful.

[System Configuration]

FIG. 1 is a diagram illustrating a schematic configuration of a wireless train control system 1 according to the present embodiment. As illustrated in FIG. 1, the wireless train control system 1 includes an on-board system 30 that is mounted on a train 20 that travels on a track R, and a ground system 10. The on-board system 30 and the ground system 10 can wirelessly communicate with each other through a predetermined wireless communication network. The wireless communication network is configured to provide contiguous communication areas along the track R. For example, this configuration may be achieved with a plurality of wireless base stations 12 provided along the track R, or with a loop antenna or a leaky coaxial cable (LCX) provided along the track R. Balise 40 for position correction are also provided along the track R.

The on-board system 30 calculates a train position and train speed of the train on the basis of a speed pulse obtained by a pulse generator (hereinafter, referred to as "PG"). The PG is one type of a rotation detector, and outputs the speed pulse in a form of a rotation detection signal corresponding to a rotation frequency of an axle or a wheel to which the device is attached. When the train 20 passes through the balise 40, the train position is corrected with an absolute position associated with the balise 40. The on-board system 30 transmits information including a train ID, the train position, and the train speed of the train, to the ground system 10, and controls the traveling (speed) of the train on the basis of control information transmitted from the ground system 10.

For example, the ground system 10 is installed in a central control room and the like, and wirelessly communicates with the on-board system 30 through the wireless communication network to control each train 20 on the track R. Specifically, the ground system 10 generates control information for each train 20, and transmits the control information to the corresponding on-board system 30. The control information is generated on the basis of information (occupancy information) about a position of each train 20 based on travel information transmitted from the on-board system 30, route information obtained from an interlocking device (not illustrated), and the like.

[Principle]

(A) Train Occupancy Range

The train position calculated by the on-board system 30 is position of a predetermined portion (for example, a front end portion of the first vehicle) of the train. The position information about the train 20, transmitted from the on-board system 30 to the ground system 10, is a train occupancy range in which the train 20 may exist, determined on the basis of the train position.

Figure 2:
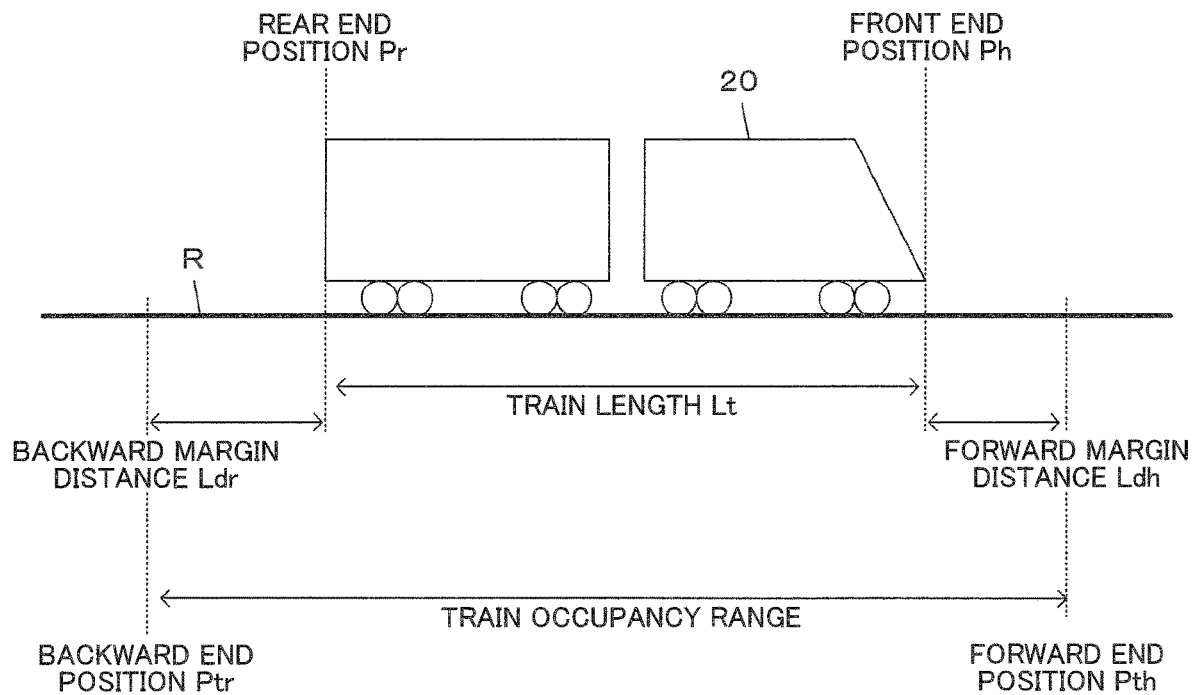
FIG. 2 is a diagram for explaining a train occupancy range.

FIG. 2 is a diagram for explaining the train occupancy range. The train occupancy range is a range determined on the basis of a train length Lt while taking account of a measurement error due to the PG. Specifically, the train length Lt is a length between a position Ph of a front end portion (front end position) of the first vehicle of the train 20 and a position Pr of a rear end portion (rear end position) of the last vehicle. Thus, the front end position Ph is obtained from the train position, and the rear end position Pr is obtained as a position situated backward from the front end position Ph by the train length Lt. The train occupancy range is between a forward end position Pth situated forward from the front end position Ph by a forward margin distance Ldh and a backward end position Ptr situated backward from the rear end position Pr by a backward margin distance Ldr. For example, the forward end position Pth and the backward end position Ptr are transmitted from the on-board system 30 to the ground system 10 as information indicating the train occupancy range.

(B) Train Position Correction

The train position calculated on the basis of the speed pulse obtained by the PG includes an error. Thus, the on-board system 30 performs predetermined position correction communications with the balise 40 when the train 20 passes through the balise 40, to correct the train position that has been calculated. The position correction communications are what is known as near field wireless communications. The position correction communications successfully performed with the balise 40 when the train 20 passes through the balise 40 are hereinafter referred to as "detection" of the balise.

(C) Determination of Detection Failure

The position correction communications failed to be performed with the balise 40 when the train 20 passes through the balise 40 (hereinafter referred to as "detection failure") leads to a failure to correct the train position, resulting in a train position with lower reliability. Possible causes of the detection failure of the balise 40 include:

(A) a failure on the side of the on-board system 30 including the on-board antenna:

(B) a failure on the side of the balise 40; and (C) a simple wireless communication failure with the on-board system 30 and the balise 40 being normal.

Figure 3:
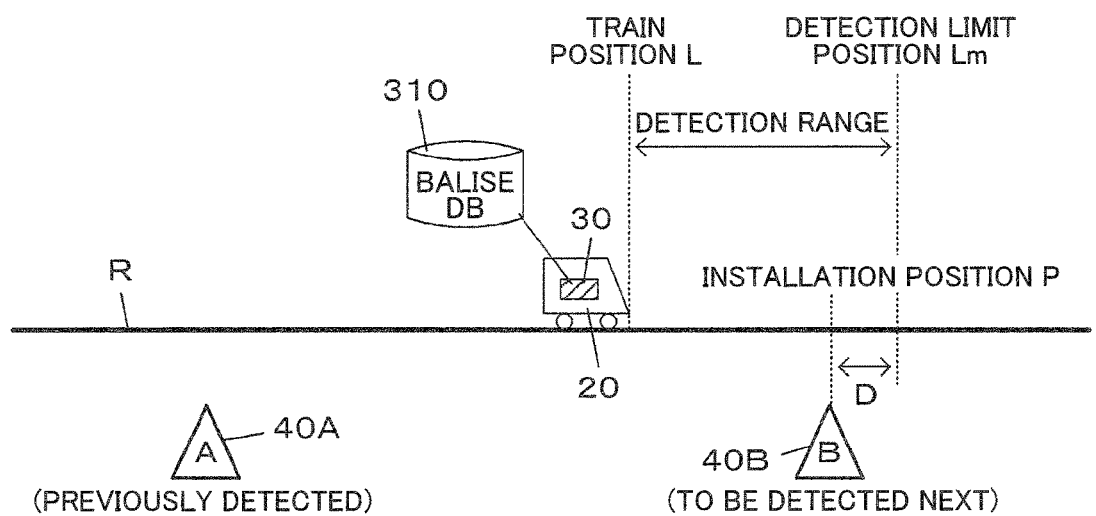
FIG. 3 is a diagram for explaining a method for determining a detection failure.

First of all, how the on-board system 30 determines the detection failure is described. FIG. 3 is a diagram for explaining a method for determining the detection failure. The on-board system 30 stores therein in advance a balise database (DB) 310 in which installation positions are each associated with a corresponding one of the balises 40 provided along the track R. The on-board system 30 refers to the balise DB 310 by using a current train position L calculated on the basis of the PG, to select a balise 40B to be detected next. Next, a detection limit position Lm is set as a position situated forward from an installation position P of the balise 40B to be detected next thus selected, by a predetermined distance D. The installation position P is an absolute position with no error, and thus the detection limit position Lm is also an absolute position with no error. The train position L is a position calculated by the on-board system 30 and includes an error. The predetermined distance D is set by taking account of the error in the calculation by the on-board system 30. Next, a range between the current train position L and the detection limit position Lm is set as a range (hereinafter, referred to as a "detection range") in which the balise 40B to be detected next may be detected.

When the train 20 passes through the detection range (when the train position L exceeds the detection limit position Lm of the balise 40B to be detected next) with no position correction communications successfully performed by the balise 40B to be detected next, the detection failure of the balise 40B to be detected next is determined to have occurred.

(D) Expansion of Train Occupancy Range in Response to Detection Failure

Upon determining that the detection failure has occurred, the on-board system 30 expands the train occupancy range to deal with the error included in the calculated train position.

FIG. 4 is a diagram for explaining the expansion of the train occupancy range due to the detection failure. As illustrated in FIG. 4A, when the detection failure is determined to have occurred with no position correction communications performed when the train 20 passes through a balise 40A to be detected next, the train occupancy range of the train 20 is expanded by increasing the forward margin distance Ldh and the backward margin distance Ldr as illustrated in FIG. 4B. At this point, which one of (A) the failure on the side of the on-board system 30, (B) the failure on the side of the balise 40A, or (C) the communication failure is the cause of the detection failure of the balise 40A cannot be determined. Still, the train position is not corrected and thus includes the error. Thus, the train occupancy range is expanded, and a notification indicating that the detection failure of the balise 40A has occurred is issued to a crew and the ground system 10.

Figure 4A:
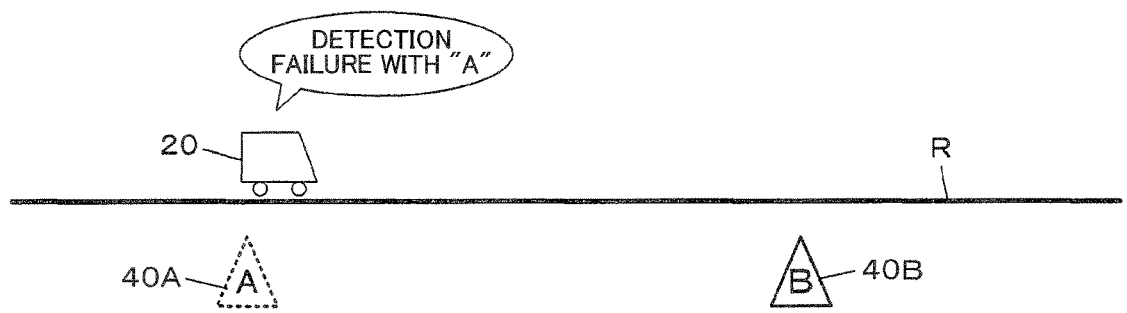
FIG. 4A, FIG. 4B, FIG. 4C and FIG. 4D are diagrams for explaining expansion of the train occupancy range due to the detection failure.
Figure 4B:
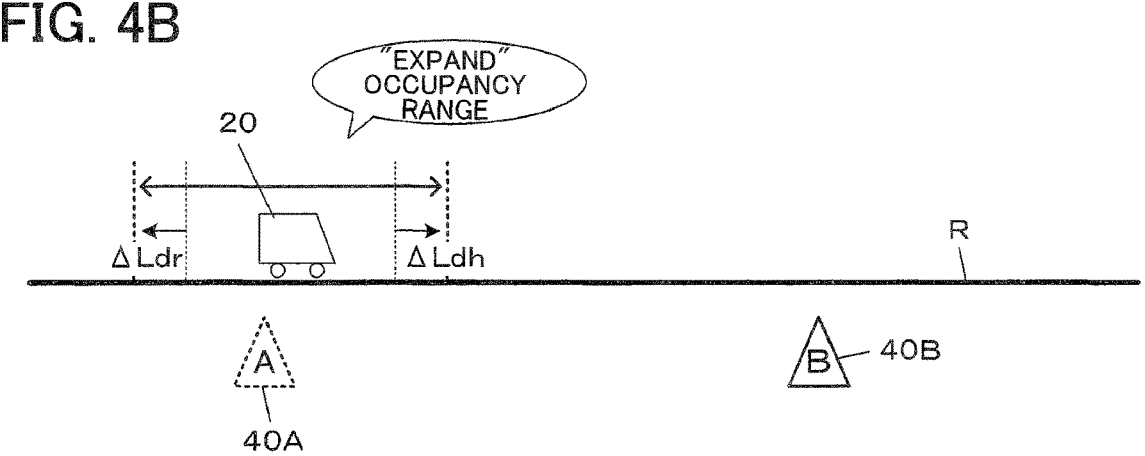
Figure 4C:
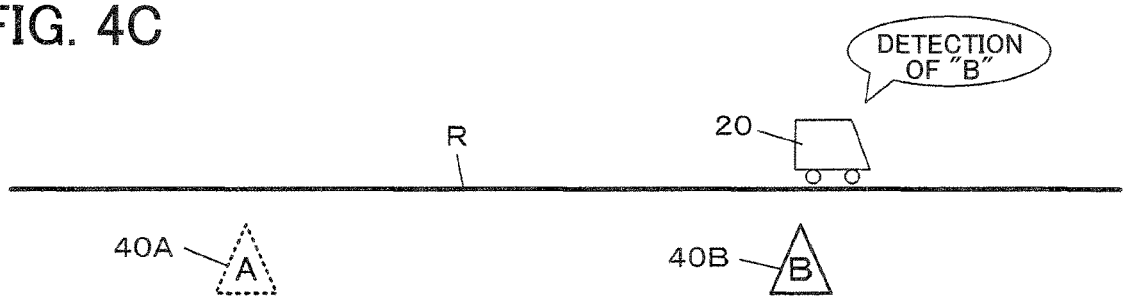
Figure 4D:
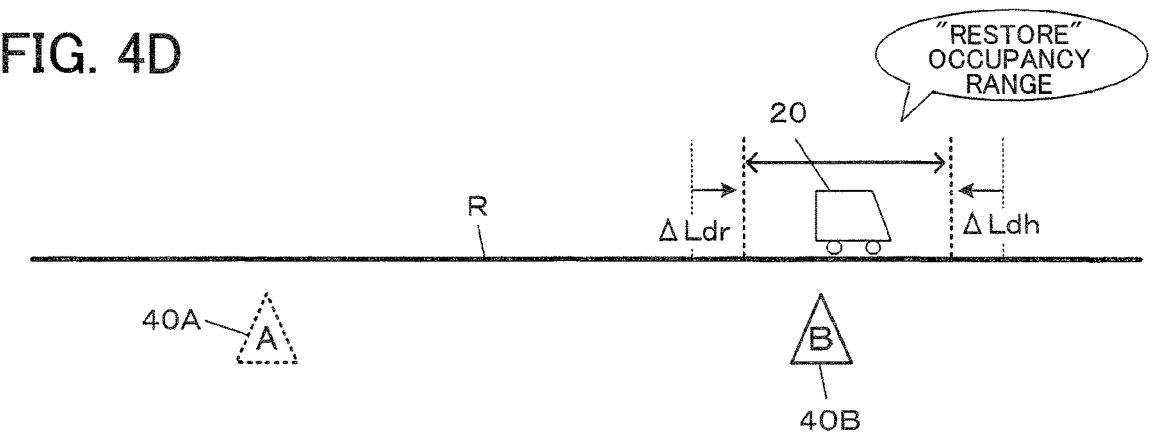

Then, when the train 20 further travels and detects the balise 40B to be detected next as illustrated in FIG. 4C, the train occupancy range of the train 20 is restored to the original length as illustrated in FIG. 4D. At this point, the cause of the detection failure of the balise 40A is estimated to be (B) the failure on the side of the balise 40A or (C) the communication failure, and not to be (A) the failure on the side of the on-board system 30.

(E) Consecutive Detection Failure

When the detection failure of the balise 40 is detected to have consecutively occurred, the train occupancy range is expanded stepwise in accordance with the number of times the detection failure is determined to have consecutively occurred.

Figure 5A:
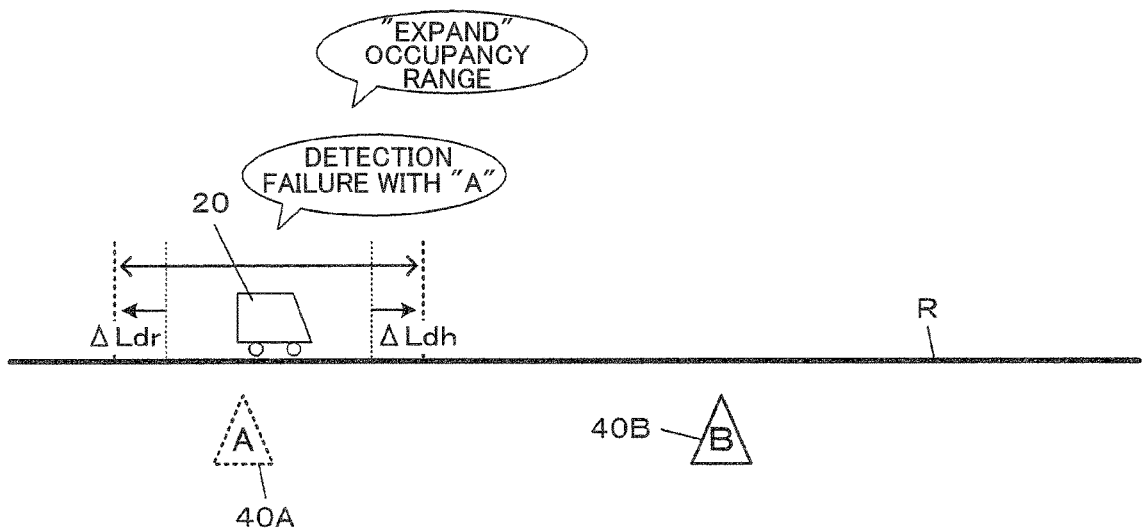
FIG. 5A, FIG. 5B and FIG. 5C are diagrams for explaining how the train occupancy range is expanded due to consecutive detection failure.
Figure 5B:
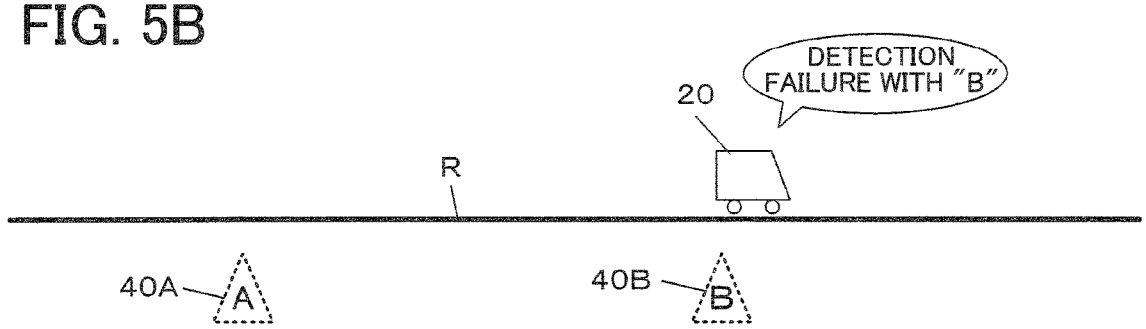
Figure 5C:
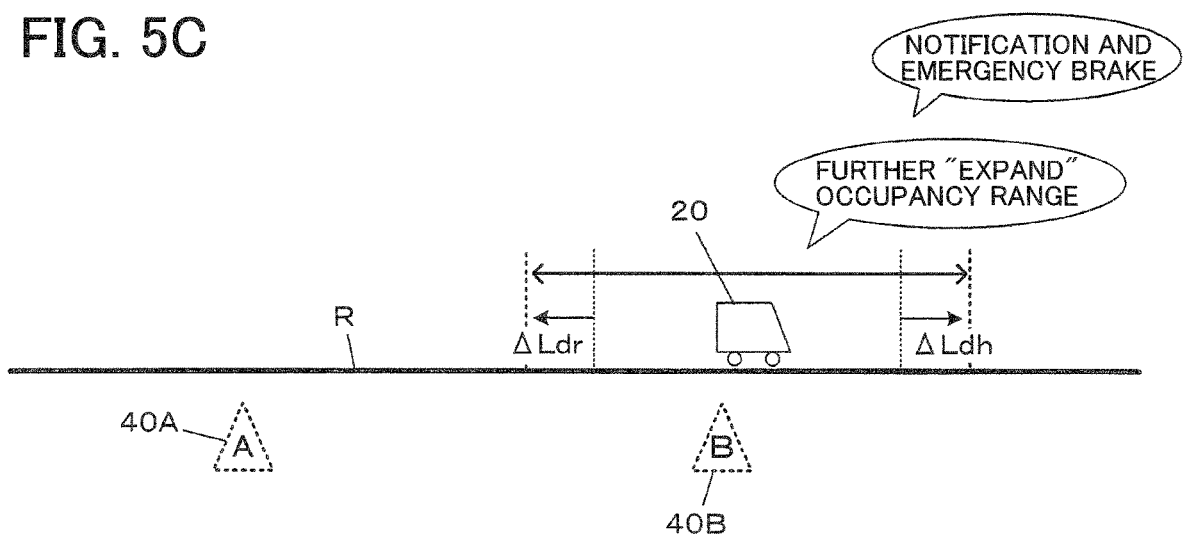

FIG. 5 is a diagram for explaining how the train occupancy range is expanded due to consecutive detection failure. When the train 20 determines that the detection failure of the balise 40A has occurred, the train occupancy range is expanded, as illustrated FIG. 5A. When the train 20 further travels, and the detection failure of the next balise 40B also occurs as illustrated in FIG. 5B, the train occupancy range is further expanded by increasing the forward margin distance Ldh and the backward margin distance Ldr as illustrated in FIG. 5C. When the number of times the detection failure is determined to have consecutively occurred reaches a predetermined times (twice in FIG. 5), a notification indicating that failure of the on-board system 30 has occurred is issued to the ground system 10, and an emergency brake is activated to cause emergency stop of the train 20.

Specifically, when the number of times the detection failure has consecutively occurred reaches the predetermined times, the cause of the detection failure is estimated to be (A) the failure on the side of the on-board system 30. A longer distance traveled while the detection failure is occurring results in a larger error in the train position calculated by the on-board system 30. Thus, the train occupancy range is increased stepwise, that is, increased each time the detection failure is determined to have occurred consecutively.

[Functional Configuration]

Figure 6:
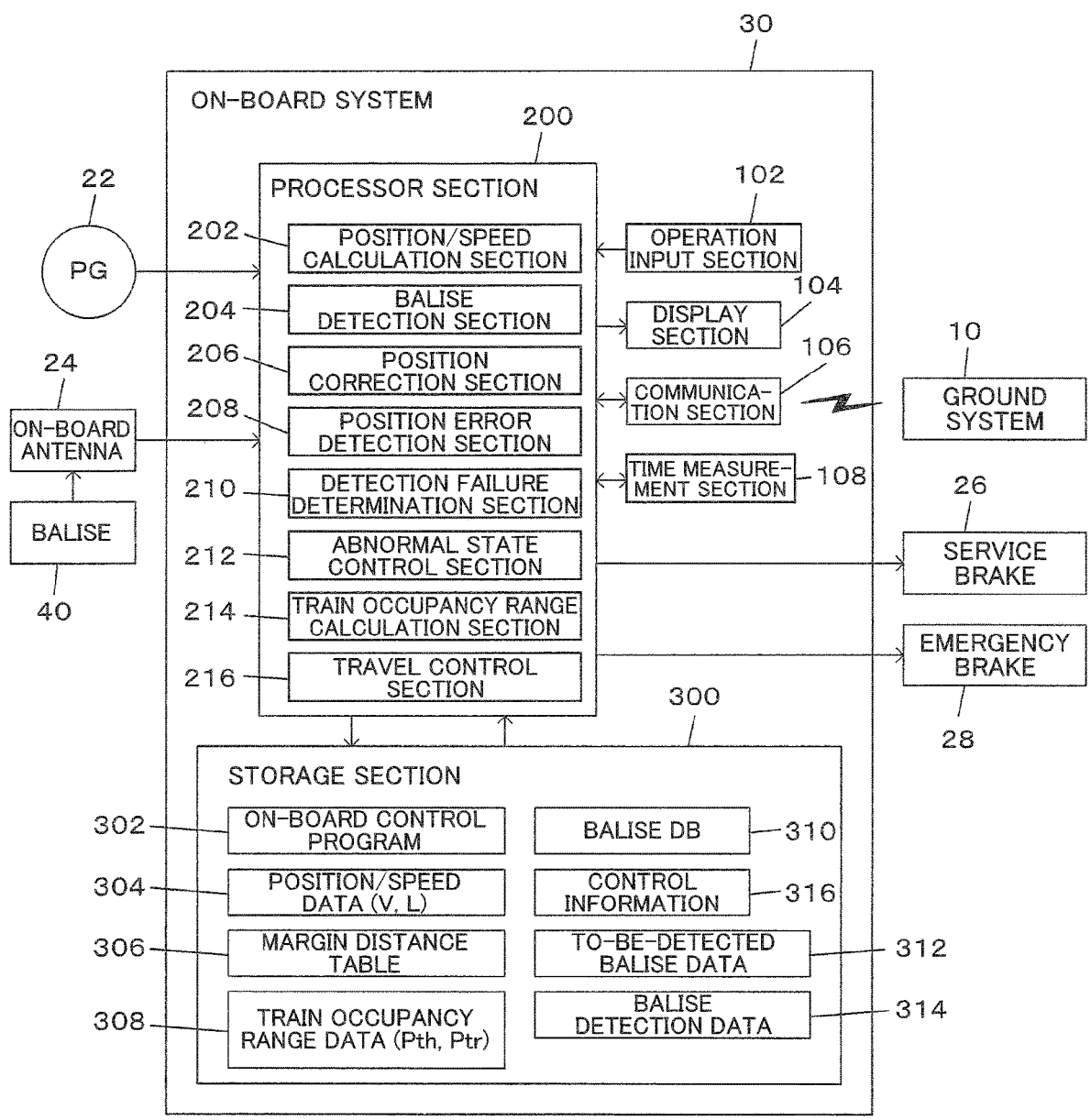
FIG. 6 is a diagram illustrating a functional configuration of an on-board system.

FIG. 6 is a diagram illustrating a functional configuration of the on-board system 30. As illustrated in FIG. 6, the on-board system 30 is a kind of computer including an operation input section 102, a display section 104, a communication section 106, a time measurement section 108, a processor section 200, and a storage section 300.

For example, the operation input section 102 is implemented with an input device such as a keyboard, a touch panel, various switches, and various sensors, and outputs an operation signal, corresponding to an operation performed on the operation input section 102, to the processor section 200. For example, the display section 104 is implemented with a display device such as a light emitting diode (LED) and a small liquid crystal display, and performs various types of displaying on the basis of a display signal from the processor section 200. The communication section 106 includes a wireless communication module and the like, and is connected to a wireless base station 12, to which radio waves can reach, to perform wireless communications with an external device including the ground system 10 through the wireless communication network. The time measurement section 108 includes an oscillation circuit including a crystal oscillator, and outputs a time signal to the processor section 200. The time signal includes a current time measured, a time period elapsed after a designated timing, and the like.

For example, the processor section 200 is implemented with a computing device such as a central processing unit (CPU), and performs overall control on the on-board system 30, on the basis of a program and data stored in the storage section 300, data received via the communication section 106, and the like. The processor section 200 includes a functional sections including a position/speed calculation section 202, a balise detection section 204, a position correction section 206, a position error detection section 208, a detection failure determination section 210, an abnormal state control section 212, a train occupancy range calculation section 214, and a travel control section 216. The functional sections may be implemented by software with the processor section 200 executing an on-board control program 302, or may be implemented by an electronic circuit such as an application specific integrated circuit (ASIC) and a field programmable gate array (FPGA).

The position/speed calculation section 202 calculates a train speed V and a train position L of the train, on the basis of the speed pulse output by the PG 22. The train speed V and the train position L calculated are updated and stored as appropriate as position/speed data 304.

The balise detection section 204 performs the position correction communications with the balise 40 via the on-board antenna 24, when the train 20 passes through the installation position of the balise 40. When the position correction communications are successfully performed, the balise 40 as the communication target is "detected". The balise detection section 204 can identify the balise 40 as the communication target by performing the position correction communications to receive the balise ID of the balise 40 from the balise 40.

A result of the position correction communications with the balise 40 is stored as balise detection data 314. FIG. 7 is a diagram illustrating an example of a data structure of the balise detection data 314. As illustrated in FIG. 7, in the balise detection data 314, the balise ID, the train position at the detection timing, and a detection flag are stored while being associated with each other for each balise 40. The train position at the detection timing is the train position at the timing when the position correction communications are performed, and thus is the train position L before the position correction. The detection flag is a flag indicating whether or not the corresponding balise 40 has been detected.

The position correction section 206 corrects the train position L on the basis of the position correction communications with the balise 40 by the balise detection section 204. Specifically, the position correction section 206 refers to the balise DB 310, and updates the train position L with the installation position of the balise 40 associated with the balise ID acquired through the position correction communications.

FIG. 8 is a diagram illustrating an example of a data structure of the balise DB 310. As illustrated in FIG. 8, in the balise DB 310, the balise ID and the installation position are stored while being associated with each other for each of the balises 40 provided along the track R.

When the position correction communications are performed with the balise 40, the position error detection section 208 calculates the error between the train position (the train position L before the correction by the position correction section 206) at that timing and the installation position of the balise 40. When this position error is equal to or larger than a predetermined threshold, indicating an unacceptable error, it is determined that there has been a failure in the calculation of the train position by the on-board system 30. Thus, abnormality detection information, indicating that there has been a failure in the position calculation, is transmitted to the ground system 10, and the emergency brake 28 is activated to cause the emergency stop of the train.

The detection failure determination section 210 determines whether or not the detection failure has occurred. Specifically, the detection failure determination section 210 refers to the balise DB 310 by using the current train position L of the train, and selects the balise 40 to be detected next and its installation position. Then, the detection limit position Lm situated forward from the installation position of the balise 40 to be detected next selected by the predetermined distance D is determined, and the detection range is set to be a range between the current position L of the train and the detection limit position Lm. When the train position L of the train exceeds the detection range with no position correction communications performed with the balise 40 to be detected next, it is determined that the detection failure has occurred due to the failure to detect the balise 40 to be detected next. A consecutive failure detection count is incremented by "1" to be updated. On the other hand, when the position correction communications with the balise 40 to be detected next are successfully performed before the train moves out from the detection range, the consecutive failure detection count is reset to "0". The balise 40 to be detected next and its detection range are updated/stored as appropriate as to-be-detected balise data 312.

For example, when the detection failure determination section 210 determines that the detection failure has occurred, the abnormal state control section 212 displays a predetermined message on the display section 104 to issue a notification indicating the occurrence of the detection failure to a crew of the train. When the consecutive failure detection count reaches the predetermined count (which may be two or three), abnormality detection information, indicating a failure has occurred in the on-board system 30, is transmitted to the ground system 10, and the emergency brake 28 is activated to cause the emergency stop of the train.

The train occupancy range calculation section 214 calculates the train occupancy range on the basis of the train position L of the train calculated by the position/speed calculation section 202. Specifically, the front end position Ph and the rear end position Pr of the train is determined on the basis of the train position L. Furthermore, the forward margin distance Ldh and the backward margin distance Ldr are determined in accordance with the consecutive failure detection count, with reference to a margin distance table 306. Then, the train occupancy range is calculated as a range between the backward end position Ptr situated backward from the rear end position Pr by the backward margin distance Ldr and the forward end position Pth situated forward from the front end position Ph by the forward margin distance Ldh. The train occupancy range thus calculated is updated/stored as the train occupancy range data 308.

FIG. 9 is a diagram illustrating an example of a data structure of the margin distance table 306. As illustrated in FIG. 9, in the margin distance table 306, the forward margin distance and the backward margin distance are stored while being associated with each other, for each consecutive failure detection count. The forward margin distance and the backward margin distance are set to be longer for a larger consecutive failure detection count. Thus, the train occupancy range is expanded stepwise in accordance with the consecutive failure detection count, with an expansion amount increasing in accordance with the distance traveled after the latest detection.

The travel control section 216 controls the train speed of the train on the basis of control information 316 received from the ground system 10. Specifically, for example, a speed check pattern is generated for making the train stop at a stop target designated by the control information 316, on the basis of a railway line condition, a traveling performance of the train, and the like. Then, a checked speed corresponding to the current train position determined with the speed check pattern and the current train speed of the train are compared with each other. When the train speed is higher than the checked speed, the train is decelerated by activating a service brake 26.

[Process Flow]

Figure 10:
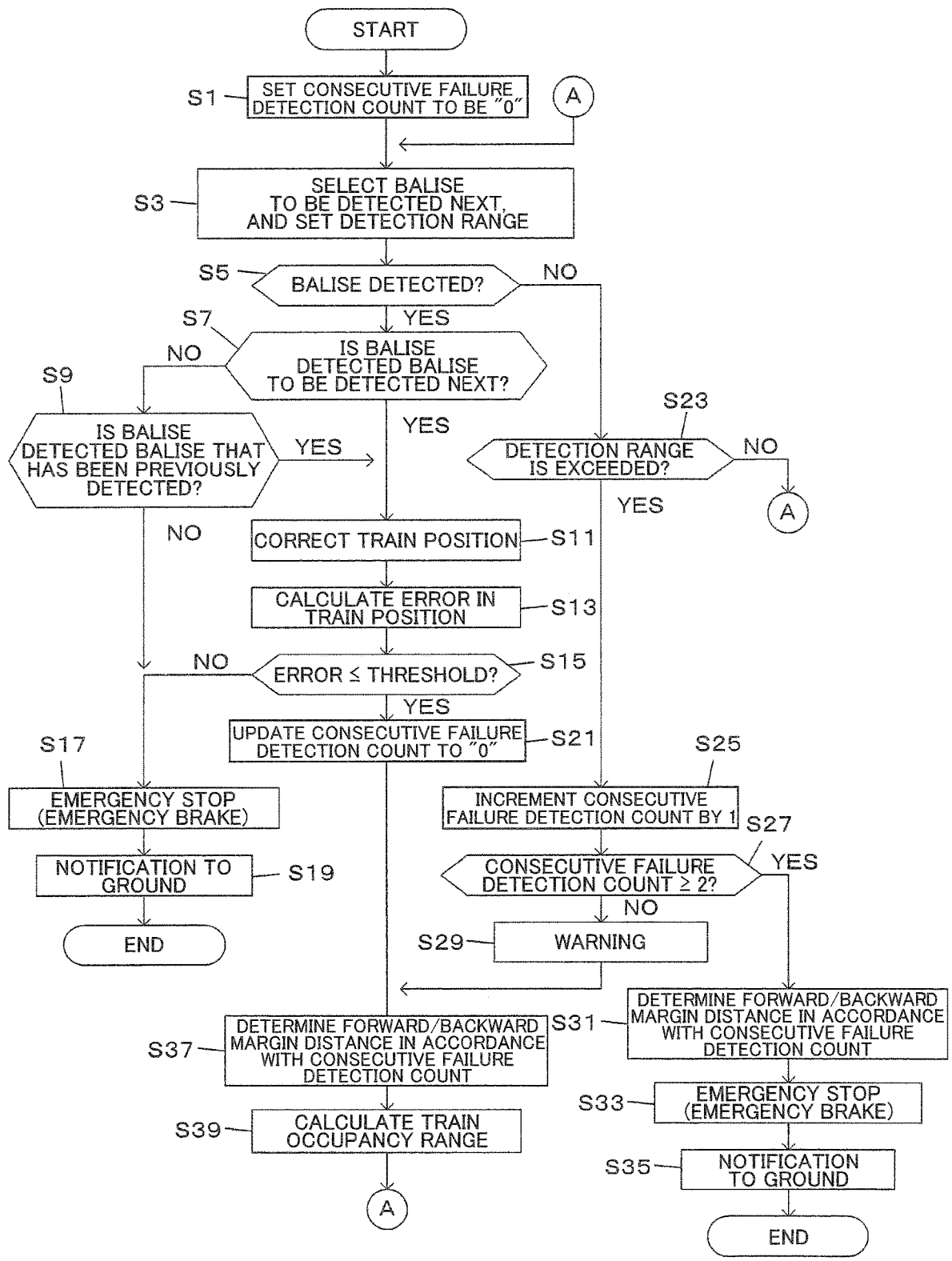
FIG. 10 is a flowchart illustrating a flow of an on-board control process.

FIG. 10 is a flowchart illustrating a flow of an on-board control process in the on-board system 30. The process is implemented with the processor section 200 executing the on-board control program.

First of all, the consecutive failure detection count is set to be "0" as the initial setting (step S1). Next, the detection failure determination section 210 refers to the balise DB 310 to select the balise 40 to be detected next, and sets the detection range including the installation position of the balise 40 (step S3).

When the balise detection section 204 detects the balise 40 (step S5: YES) and when the balise 40 detected is the balise 40 to be detected next (step S7: YES) or is the balise 40 that has been previously detected (step S7: NO-step S9: YES), the position correction section 206 corrects the train position through the position correction communications with the balise 40 (step S11).

Next, the position error detection section 208 calculates an error between the train position before correction (that is, the train position at the timing when the balise 40 has been detected) and the installation position of the balise 40 detected (step S13). When the position error calculated does not exceed a predetermined threshold (step S15: YES), the consecutive failure detection count is updated to "0" (step S21). Then, the forward margin distance Ldh and the backward margin distance Ldr are determined on the basis of the consecutive failure detection count ("0" in this case) (step S37), and the train occupancy range is calculated on the basis of the train position (step S39).

On the other hand, when the position error exceeds the threshold (step S15: NO), the emergency brake is activated to cause the emergency stop of the train (step S17), and an abnormality signal indicating that there has been a failure in the position calculation is transmitted to the ground system 10 (step S19).

When the balise 40 detected is not the balise 40 to be detected next (step S7: NO) and the balise 40 that has been previously detected (step S9: NO), the emergency brake is activated to cause the emergency stop of the train (step S17), and an abnormality signal indicating that a failure has occurred in the position calculation is transmitted to the ground system 10 (step S19).

When the detection range is exceeded (step S23: YES) with no balise 40 detected (step S5: NO), the consecutive failure detection count is incremented by "1" to be updated (step S25). When the consecutive failure detection count after the change is equal to or more than "2" that is the predetermined count (step S27: YES), the forward margin distance Ldh and the backward margin distance Ldr are determined in accordance with the consecutive failure detection count, and the train occupancy range is calculated on the basis of the train position (step S31). Then, the abnormal state control section 212 activates the emergency brake to cause the emergency stop of the train (step S33), and transmits an abnormality signal indicating that a failure has occurred in the on-board system 30 to the ground system 10 (step S35).

When the consecutive failure detection count is less than "2" (step S27: NO), a warning indicating that the detection failure has occurred and the train position is not corrected is issued to a crew's cabin (step S29). Then, the forward margin distance Ldh and the backward margin distance Ldr are determined in accordance with the consecutive failure detection count (step S37), and the train occupancy range is calculated on the basis of the train position (step S39). When this process described above is completed, the process returns to step S3 to be repeated in a similar manner.

Advantageous Effects

With the present embodiment, the on-board system 30 increases the forward margin distance Ldh and the backward margin distance Ldr to expand the train occupancy range, when it is determined that the position correction communications with the balise 40 fail to be performed when the train passes through the installation position of the balise 40, that is, when it is determined that the detection failure has occurred. The train position calculated based on the speed pulse from the PG 22 includes an error that may be accumulated and increase as the train travels, if not corrected based on the position correction communications with the balise 40. In view of this, when the detection failure has occurred, the train occupancy range is expanded by taking account of the error in the train position calculated, so that train service with safety guaranteed can be achieved.

The invention is not limited to the above embodiments. Various modifications and variations may be made without departing from the scope of the invention.

(A) Train Occupancy Range Expansion

The train occupancy range may be expanded, when the detection failure is determined to have occurred, by an amount determined in accordance with the distance traveled after the latest balise detection, instead of increasing stepwise in accordance with the consecutive failure detection count.

Figure 11:
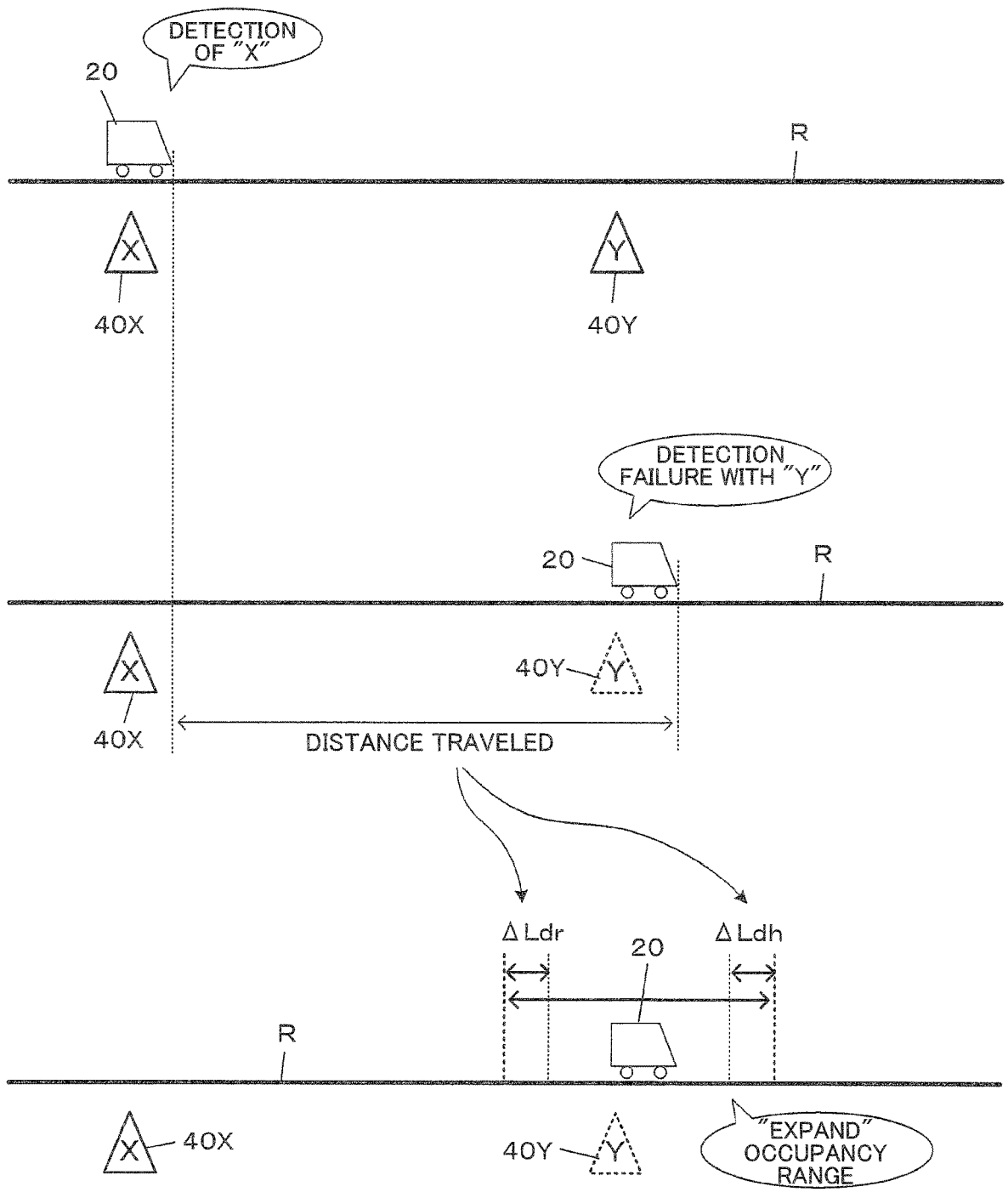
FIG. 11 is a diagram for explaining how the train occupancy range is expanded in accordance with a distance traveled.

Specifically, as illustrated in FIG. 11, the train occupancy range of the train 20 is expanded when the detection failure of a balise 40Y to be detected next is determined have occurred after the train position has been corrected with a balise 40X detected. In this process, the forward margin distance Ldh and the backward margin distance Ldr are determined in accordance with the distance traveled after the timing when the balise 40X was detected. Without the correction, the error in the train position may increase in accordance with the distance traveled. In view of this, for example, the forward margin distance Ldh and the backward margin distance Ldr are determined to increase in proportion to the distance traveled after the timing when the balise 40 has been detected. Thus, the train occupancy range can be more appropriately determined, whereby the safety of the train service can be more effectively guaranteed.

(B) Detection Range

Two types ranges including a "first detection range" and a "second detection range" described below may be used as the "detection range" in the embodiment described above.

Figure 12A:
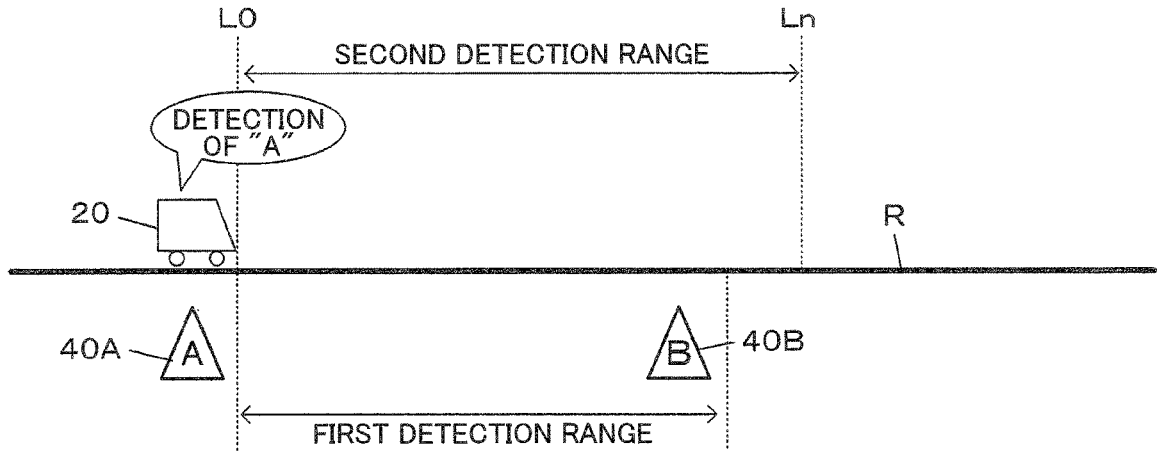
FIG. 12A, FIG. 12B and FIG. 12C are diagrams illustrating another setting example of a detection range.

Specifically, as illustrated in FIG. 12A, when the train 20 detects the balise 40A, a first detection range and a second detection range are set as the detection range for determining whether or not the balise 40B to be detected next is detected. The first detection range corresponds to the "detection range" according to the embodiment described above (see FIG. 3). Specifically, the "first detection range" is set to be a range between the current train position L of the train 20 and the detection limit position Lm situated forward from the installation position P of the balise 40B to be detected next by the predetermined distance D. The "second detection range" is set to be a range between a train position L0 at the timing when the train 20 has detected the balise 40A and a position Ln situated forward from the train position L0 by a predetermined "threshold distance". This "threshold distance" is set to be longer than the interval between the balise 40 provided, and is set in such a manner that the second detection range includes the first detection range.

Figure 12B:
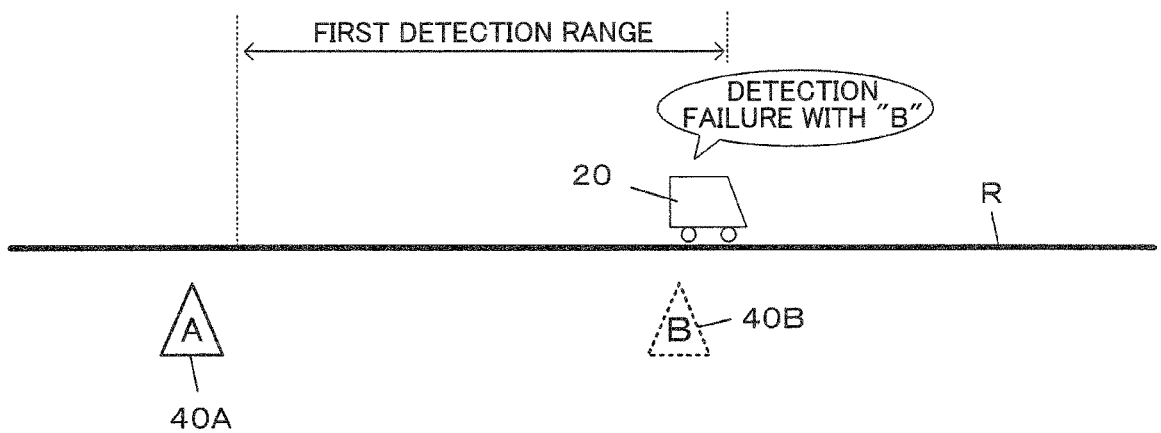
Figure 12C:
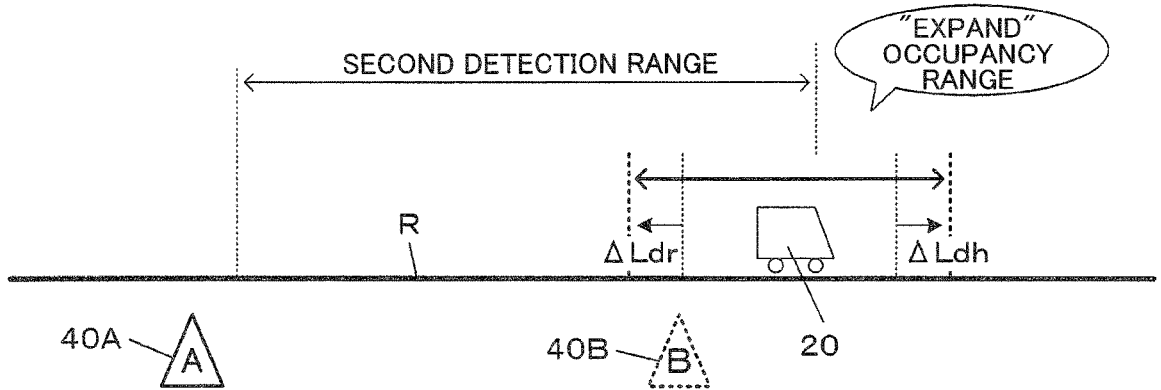

As illustrated in FIG. 12B, when the train 20 exceeds the "first detection range", the detection failure of the balise 40B has occurred. At this point, the consecutive failure detection count is set to be "1", but the train occupancy range remains unchanged because the train 20 has not exceeded the "second detection range" yet. Then, when the train 20 further travels to exceed the "second detection range", the train occupancy range of the train 20 is expanded as illustrated in FIG. 12C.

(C) Notification to Ground in Response to Detection Failure

The notification indicating that a failure has occurred in the on-board system 30 is issued from the on-board system 30 to the ground system 10 when the consecutive failure detection count reaches 2. Alternatively, the count for issuing the notification may be three or more, or may be one.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. An on-board system mounted on a train that travels on a track, and calculating a train occupancy range in which the train may exist, wherein the train is provided with a rotation detector and a communication device, the rotation detector outputting a rotation detection signal corresponding to rotation of an axle or a wheel, the communication device performing, when the train passes through an installation position of each of balises for position correction provided along the track, predetermined position correction communications with the balise, the on-board system performing:

calculating a train position of the train on the basis of the rotation detection signal, detecting that the position correction communications have been performed, correcting the train position on the basis of the position correction communications when the detecting has been successfully performed, setting a first detection range for determining whether or not a balise to be detected next is detected and a second detection range with a range limit situated anterior to the first detection range, determining that detection failure has occurred when the train position exceeds the first detection range with the detecting failing for the balise to be detected next, counting a consecutive detection failure count indicating number of times the detection failure has been determined to have consecutively occurred, determining the train occupancy range of a predetermined range length with respect to the train position, the train occupancy range being determined with the range length of the train occupancy range increased when the train position exceeds the second detection range with the detecting failing for the balise to be detected next, and stopping the train when the consecutive detection failure count reaches a predetermined count.

2. The on-board system according to claim 1, wherein the determining the train occupancy range includes increasing the range length stepwise, in accordance with the consecutive detection failure count.

3. The on-board system according to claim 1, further comprising issuing a predetermined notification when the correcting is performed for an error of the train position that is equal to or larger than a predetermined threshold.

4. The on-board system according to claim 2, further comprising issuing a predetermined notification when the correcting is performed for an error of the train position that is equal to or larger than a predetermined threshold.

5. A train occupancy range calculation method performed by an on-board system mounted on a train that travels on a track to calculate a train occupancy range in which the train may exist, the train being provided with a rotation detector and a communication device, the rotation detector outputting a rotation detection signal corresponding to rotation of an axle or a wheel, the communication device performing, when the train passes through an installation position of each of balises for position correction provided along the track, predetermined position correction communications with the balise, the method comprising:

calculating a train position of the train on the basis of the rotation detection signal, detecting that the position correction communications have been performed, correcting the train position on the basis of the position correction communications when the detecting has been successfully performed, setting a first detection range for determining whether or not a balise to be detected next is detected and a second detection range with a range limit situated anterior to the first detection range, determining that detection failure has occurred when the train position exceeds the first detection range with the detecting failing for the balise to be detected next, counting a consecutive detection failure count indicating number of times the detection failure has been determined to have consecutively occurred, determining the train occupancy range of a predetermined range length with respect to the train position, the train occupancy range being determined with the range length of the train occupancy range increased when the train position exceeds the second detection range with the detecting failing for the balise to be detected next, and stopping the train when the consecutive detection failure count reaches a predetermined count.

* * * * *